(12) United States Patent
Lee et al.

(10) Patent No.: US 6,915,029 B2
(45) Date of Patent: Jul. 5, 2005

(54) HIGH DENSITY INTEGRATED OPTICAL CHIP WITH LOW INDEX DIFFERENCE AND HIGH INDEX DIFFERENCE WAVEGUIDE FUNCTIONS

(75) Inventors: Kevin K. Lee, Cambridge, MA (US); Desmond R. Lim, Cambridge, MA (US)

(73) Assignee: LNL Technologies, Inc., Cambridge, MA (US)

( * ) Notice: Subject to any disclaimer, the term of this patent is extended or adjusted under 35 U.S.C. 154(b) by 225 days.

(21) Appl. No.: 10/384,503

(22) Filed: Mar. 7, 2003

(65) Prior Publication Data

US 2004/0028314 A1 Feb. 12, 2004

Related U.S. Application Data

(63) Continuation-in-part of application No. 10/095,497, filed on Mar. 12, 2002.

(51) Int. Cl.[7] ............................................. G02B 6/12
(52) U.S. Cl. ........................ 385/14; 385/31; 385/32; 385/49; 385/42; 385/89; 385/92; 385/129; 385/130; 385/43; 385/131; 385/132; 385/27; 385/28
(58) Field of Search ............................. 385/14, 49, 39, 385/42, 88, 89, 129, 130, 131, 132, 123, 124, 32, 43, 27, 28, 31, 92

(56) References Cited

U.S. PATENT DOCUMENTS

| | | | | |
|---|---|---|---|---|
| 5,222,167 A | | 6/1993 | Jean et al. ..................... 385/45 |
| 5,343,542 A | * | 8/1994 | Kash et al. ..................... 385/31 |
| 5,416,861 A | * | 5/1995 | Koh et al. ..................... 385/14 |
| 5,455,878 A | | 10/1995 | Thaniyavarn ................ 385/16 |
| 5,577,141 A | | 11/1996 | Adar et al. .................... 385/43 |
| 5,629,999 A | | 5/1997 | Henry et al. .................. 385/43 |
| 5,737,458 A | * | 4/1998 | Wojnarowski et al. ........ 385/15 |
| 6,293,688 B1 | | 9/2001 | Deacon ....................... 362/556 |
| 6,311,003 B1 | * | 10/2001 | Dubey et al. ................ 385/130 |
| 6,516,121 B2 | * | 2/2003 | Laor ............................ 385/49 |
| 6,608,946 B2 | * | 8/2003 | Kikuchi et al. ................ 385/14 |
| 2002/0009270 A1 | * | 1/2002 | Laor ............................ 385/95 |
| 2003/0012493 A1 | * | 1/2003 | Lee et al. ...................... 385/28 |
| 2003/0174925 A1 | * | 9/2003 | Lee et al. ...................... 385/14 |
| 2004/0017962 A1 | * | 1/2004 | Lee et al. ...................... 385/14 |
| 2004/0028314 A1 | * | 2/2004 | Lee et al. ...................... 385/14 |
| 2004/0030859 A1 | * | 2/2004 | Doerr et al. ................... 712/15 |
| 2004/0037497 A1 | * | 2/2004 | Lee .............................. 385/28 |
| 2004/0057667 A1 | * | 3/2004 | Yamada et al. ............... 385/43 |

* cited by examiner

*Primary Examiner*—Brian M. Healy
(74) *Attorney, Agent, or Firm*—Wilmer Cutler Pickering Hale and Dorr LLP

(57) ABSTRACT

The invention features a programmable optical chip. The optical chip has a plurality of optical functions, each of which is connected to a waveguide having a core and a cladding. A photosensitive layer is disposed between at least three of the waveguides, and the photosensitive layer has a refractive index similar to that of the cladding prior to exposure to irradiation. The photosensitive layer changes refractive index upon exposure to irradiation to selectively form an optical connection between at least two of the waveguides.

48 Claims, 11 Drawing Sheets

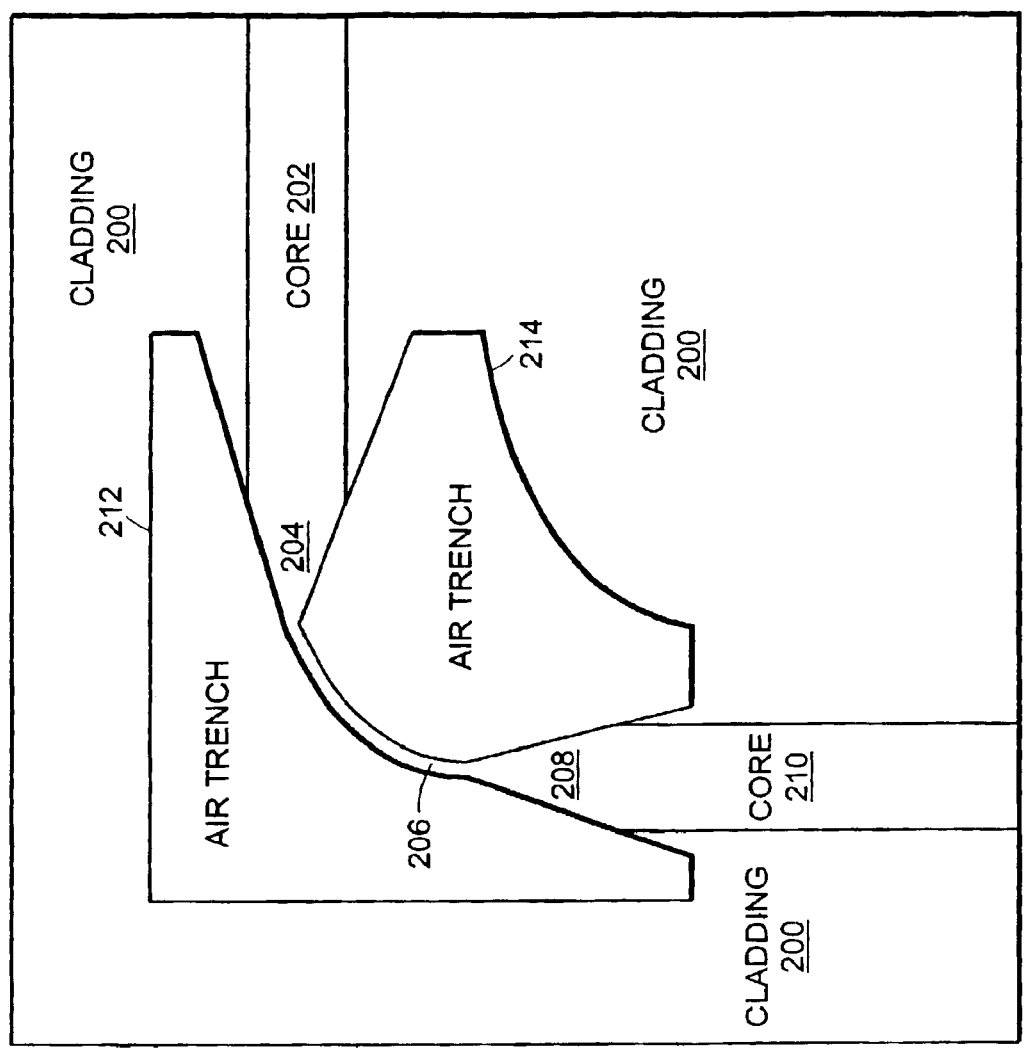

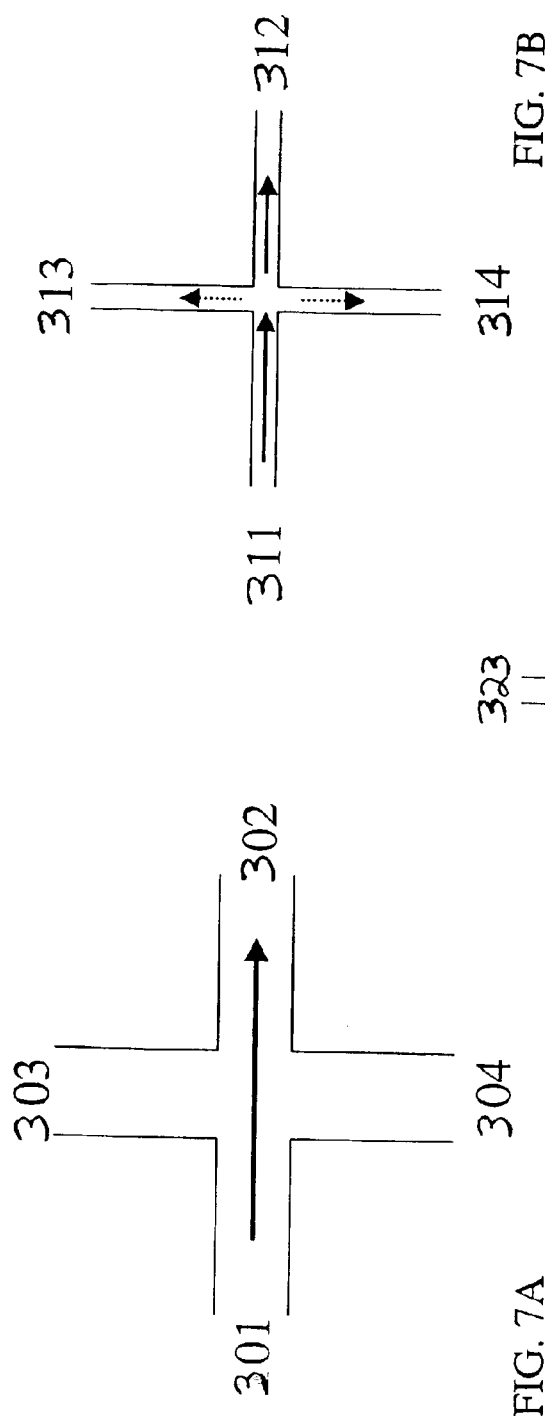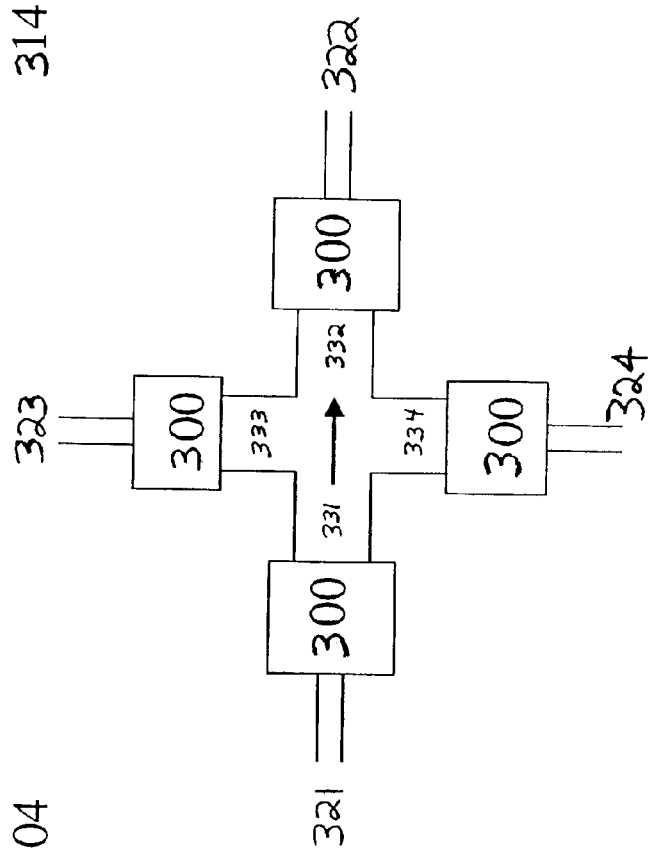
FIG. 7A
FIG. 7B
FIG. 7C

HIGH DENSITY INTEGRATED OPTICAL CHIP WITH LOW INDEX DIFFERENCE AND HIGH INDEX DIFFERENCE WAVEGUIDE FUNCTIONS

PRIORITY INFORMATION

This application is a continuation-in-part of U.S. application Ser. No. 10/095,497, filed Mar. 12, 2002, pending, and entitled "High Density Integrated Optical Chip with Low Index Difference Waveguide Functions."

FIELD

The present invention relates generally to an optical chip and, more generally, to an optical chip including at least one low minimum bending radius waveguide and at least one optical function in a large mode field size dielectric waveguide.

BACKGROUND OF THE INVENTION

Integrated optical chips with optical functions typically use low index difference waveguides. FIG. 1 shows a typical planar dielectric waveguide, which is an example of a two-dimensional waveguide. Low index difference waveguides, such as those used in optical chips and for the optical fiber waveguides for input to and output from optical chips, are three-dimensional versions of such planar dielectric waveguides. These low index difference waveguides 10 include a core material 12 surrounded by a cladding material 14. The core material 12 can have an arbitrary cross-section, including a circular, elliptical, square, or rectangular cross-section embedded in the cladding material 14. The index of refraction $n_1$ of the core material 12 is slightly larger than the index of refraction $n_2$ of the cladding material 14. The index difference $\Delta n$ for the index of refraction $n_1$ of the core material 12 and the index of refraction $n_2$ of the cladding material 14 ($\Delta n = n_1 - n_2$) is therefore generally very small. A useful metric is delta ($\Delta$), which is defined as $\Delta n/n_{cladding}$ for this type of waveguide, and is generally around 0.01 (1 percent) to 0.04 (4 percent), and certainly less than 0.1 (10 percent). In other words:

$$\Delta = (n_1 - n_2)/n_2 \ll 1.$$

A ray of light moving in the z direction in FIG. 1 (from left to right) is guided by total internal reflection within the core material 12 if the angle of incidence $\theta$ of the ray with respect to the interface between the core material 12 and the cladding material 14 is larger than a critical angle $\theta_c$. This critical angle $\theta_c$ equals $\sin^{-1}(n_2/n_1)$. For low index difference waveguides, due to the indices of refraction $n_1$, $n_2$, the angle of incidence $\theta$ must be large in order for total internal reflection to guide the light ray through the waveguide.

The typical optical chips having low index difference waveguides are generally large, wafer-sized chips. This large size results because the low index difference waveguides can adequately guide light only if bends in the waveguides have large radii. If small bending radii are used with these low index difference waveguides, large losses result because light is loosely confined within the core material 12. Low index difference waveguides therefore function adequately without large losses only with relatively high bending radii, and it is therefore difficult to perform optical functions in small areas using these low index difference waveguides.

The use of higher index difference waveguides reduces the minimum bending radii while maintaining adequate performance (that is, low loss), and therefore reduces the area required to perform the optical functions. The index of refraction $n_1$ of the core material 12 is significantly larger than the index of refraction $n_2$ of the cladding material 14 for such a higher index difference waveguide. Delta ($\Delta$) for a high index difference waveguide is typically at least as large as 0.1, 0.2, or 0.3. In other words:

$$\Delta = (n_1 - n_2)/n_2 \geq 0.1.$$

In such a high index difference waveguide, total internal reflection of light propagating through the waveguide is achieved for smaller angles of incidence $\theta$ for a ray of light, and the minimum bending radii for which performance is adequate is reduced.

SUMMARY OF THE INVENTION

The invention features an optical chip having optical functions in large mode size waveguides. Under one aspect of the invention, the optical chip features one or more large mode field size waveguides, one or more low minimum bending radius waveguides to interconnect the large mode field size waveguides, and one or more optical functions integrated within or connected to the large mode field size waveguides. At least one of the optical functions is a large mode size optical waveguide function. At least one of the large mode field size waveguides is used to communicate with optical devices, such as optical fibers, that are external to the optical chip. In other embodiments, a plurality of large mode size waveguides, low minimum bending radius waveguides, and optical functions in large mode size waveguides can be used. The optical function can be any structure or device that is used to generate, modify, and/or measure the amplitude, frequency, wavelength, dispersion, timing, propagation direction, and/or polarization properties of one or more light pulses. These embodiments allow large numbers of large mode size optical waveguide functions to be integrated on a single optical chip having a small footprint. According to another aspect of the invention, a single optical function is split into multiple pieces, with the pieces separated by low minimum bending radius waveguides having bends.

Another aspect of the invention features an optical chip having a large mode field size waveguide and a low minimum bending radius waveguide coupled to the large mode field size waveguide. The optical chip also has at least two optical functions including one optical function performed in the large mode field size waveguide and another optical function performed in the low minimum bending radius waveguide. All of these elements are fabricated monolithically on a single substrate.

Another aspect of the invention relates to a programmable optical chip. Such an optical chip features a plurality of optical functions, each of which is connected to a waveguide having a core and a cladding. A photosensitive layer is disposed between at least three of the waveguides, and the photosensitive layer has a refractive index similar to that of the cladding prior to exposure to irradiation. The photosensitive layer changes refractive index upon exposure to irradiation to selectively form an optical connection between at least two of the waveguides. The optical functions can therefore be selectively coupled on the programmable optical chip.

Another aspect of the invention relates to an optical chip that has two large mode field size waveguides, such as low index difference waveguides. The waveguides cross in a common plane. The optical chip also includes a low minimum bending radius waveguide coupled to one of the large mode field size waveguides.

BRIEF DESCRIPTION OF THE DRAWINGS

FIG. 3b is a cross-sectional view of the waveguide of FIG. 3a.

FIG. 4b is a cross-sectional view of the waveguide of FIG. 4a.

FIG. 6 is a block diagram of an embodiment that can be used for bends in waveguides according to one aspect of the invention.

FIG. 7a shows a waveguide crossing for two large mode size waveguides.

FIG. 7b shows a waveguide crossing for two low minimum bending radius waveguides.

FIG. 7c shows one implementation of a waveguide crossing according to an embodiment of the invention.

DETAILED DESCRIPTION OF THE EMBODIMENTS OF THE INVENTION

The embodiments of the invention provide optical chips with low minimum bending radius waveguides used for interconnections and optical functions performed in large mode field size waveguides. Very briefly, the optical chip includes one or more large mode field size waveguides, one or more low minimum bending radius waveguides to interconnect the large mode field size waveguides, and one or more optical functions integrated within or connected to the large mode field size waveguides. At least one of the optical functions, therefore, is a large mode size optical waveguide function. At least one of the large mode field size waveguides is used to communicate with optical devices that are external to the optical chip. These external optical devices can include optical fibers or other optical chips.

Figure 1:
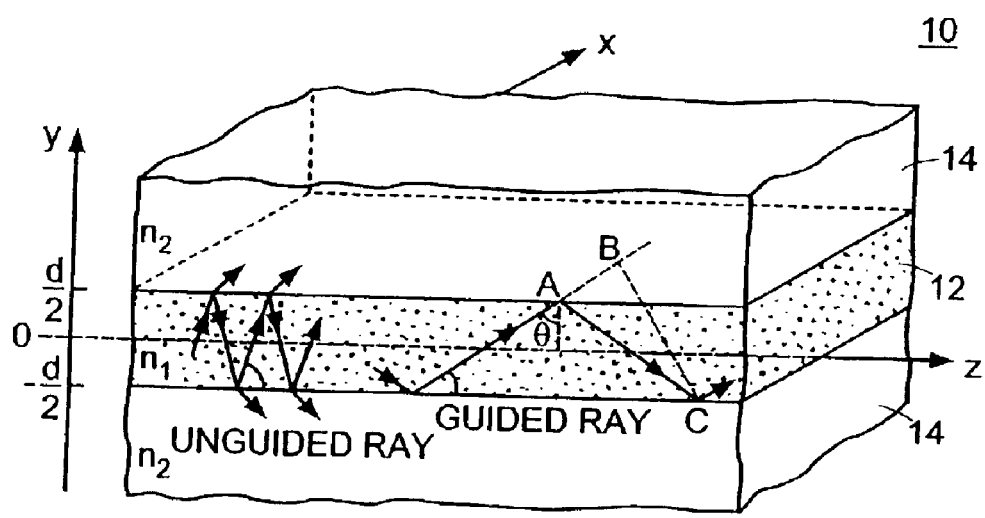
FIG. 1 is a perspective view of a prior art planar dielectric waveguide.
Figure 2:
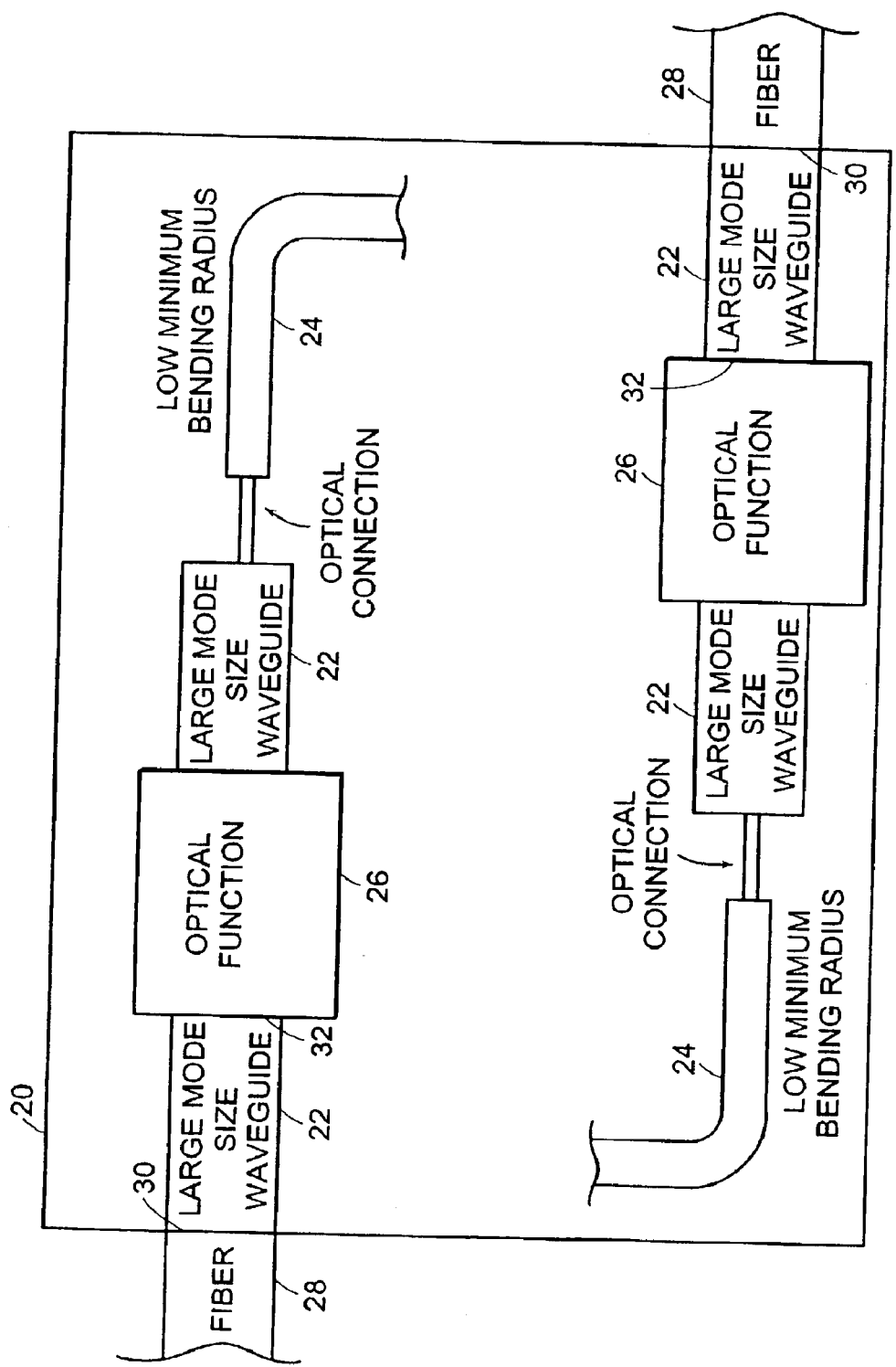
FIG. 2 is a block diagram of an optical chip according to a first embodiment of the invention.

FIG. 2 is a top view of a block diagram of an optical chip according to a first embodiment of the invention. The optical chip of FIG. 2 includes at least one large mode size waveguide 22, at least one low minimum bending radius waveguide 24, and at least one optical or electro-optical function 26 fabricated on a substrate 20. The embodiment of the optical chip of FIG. 2 depicts two low minimum bending radius waveguides 24, with each low minimum bending radius waveguide 24 being optically connected to a different large mode size waveguide 22. In addition, FIG. 2 shows an embodiment of an optical chip with two optical functions 26. In other embodiments, a single large mode size waveguide 22, a single low minimum bending radius waveguide 24, and a single optical function 26 can be disposed on the substrate 20, and in still other embodiments more than two of each of these components can be disposed on the substrate 20. FIG. 2 shows an open space between the two low minimum bending radius waveguides 24 in which, in some embodiments, addition optical functions 26, large mode size waveguides 22, and low minimum bending radius waveguides could be disposed. Any transforming device can be used to optically connect the large mode size waveguides 24 to the low minimum bending radius waveguides 22, as discussed in greater detail below.

The large mode field size waveguide 22, low minimum bending radius waveguide 24, and optical function 26 are fabricated monolithically on a single substrate 20. A number of other components can also be bonded in any manner on the substrate 20, including separate optical functions or waveguides. The substrate 20 can be made from any material, including silicon, indium phosphide, ceramic, or quartz. The substrate 20 can also be shaped in a variety of forms, including a rectangular, square, elliptical, or circular shape with a thin side profile. Generally, an optical chip includes a planar substrate 20 and patterned core materials and cladding layers that define a planar lightwave circuit (PLC) or optical circuit. At least one large mode field size waveguide 22 on the substrate 20 has a first end 30 that terminates on a side, edge, or accessible portion of the substrate 20 so that it can be connected to an external optical device, such as the optical fiber 28 shown in FIG. 2. A second end 32 of the large mode field size waveguide 22 can be optically coupled to one of the optical functions 26, as illustrated in FIG. 2, or, in other embodiments, this second end 32 could be optically coupled to one of the low minimum bending radius waveguides 24 on the substrate 20 (not shown in FIG. 2). At least one of the large mode field size waveguides 22 on substrate 20, therefore, can serve as an input/output port for the optical chip. Further, the optical chip can contain functions that change the information carrier signal from an optical signal to a different form of energy, or vice versa. Examples of alternate forms of energy that carry information include acoustic (sound/audio), radio frequency, infrared, and microwave, as well as other bands of the electromagnetic spectrum.

At least one optical function 26 is performed within or connected to one of the large mode size waveguides 22 on the substrate 20. FIG. 2 illustrates either of these embodiments with each reference to an optical function 26—e.g., (1) an embodiment in which an optical function 26 is connected to the large mode size waveguide 22, or (2) an embodiment in which the optical function 26 is an optical waveguide function that resides within the large mode size waveguide 22. In both cases and throughout this specification, at least one optical function 26 is performed within a large mode size waveguide, whether that large mode size waveguide 22 is explicitly separate from the optical function 26 or is integrated with the optical function 26. An optical function 26 is generally any structure or device that is used to generate, modify, and/or measure the amplitude, frequency, wavelength, dispersion, timing, propagation direction, and/or polarization properties of one or more light pulses. Optical functions 26 can include splitters, couplers, modulators, switches, filters, isolators, detectors, amplifiers, interference device, Multi-Mode Interferometer, Mach-Zehnder Interferometer, arrayed waveguide grating, switch, MEMS device, lasers, detectors, micro-resonators, polarization rotator, dispersion compensation device, polarization compensation device, polarization splitter, phase delay lines, and time delay lines. A single optical function 26, therefore, is a structure that performs at least one function, such as those listed above. The optical function or functions 26 can be chosen for a wide variety of applications. In addition, the optical functions 26 can be integrated with electrical functions and electro-optical functions on a single substrate 20. If a single optical chip contains multiple optical or electro-optical functions 26, low minimum bending radius waveguides 24 can be used to interconnect these optical or electro-optical functions 26.

Figure 3A:
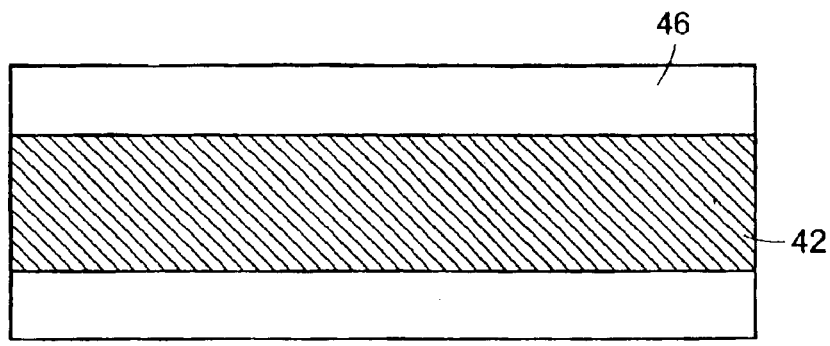
FIG. 3a is a side view of a large mode field size dielectric channel waveguide.
Figure 3B:
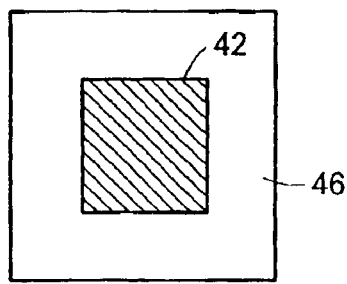
Figure 4A:
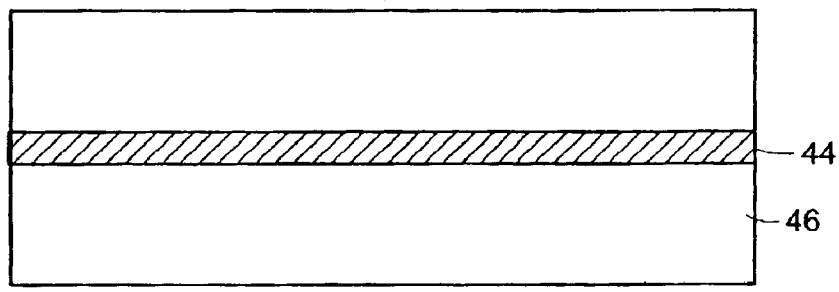
FIG. 4a is a side view of a low minimum bending radius dielectric channel waveguide.
Figure 4B:
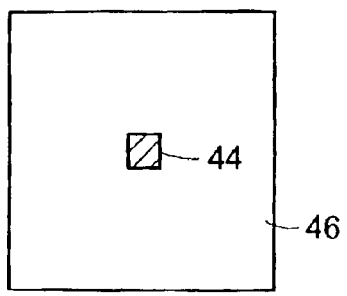

The large mode field size waveguide 22 can, in one embodiment, be a low index difference waveguide that is a channel waveguide, although in other embodiments other types of waveguides can be used as the large mode field size waveguide 22. Generally, the large mode field size waveguide 22 has a mode field size similar to that of external optical fiber, which is a low index difference waveguide. The low minimum bending radius waveguide 24 can, in one embodiment, be a high index difference waveguide. The low index difference waveguides, when used, include a core material 42 having an index of refraction $n_1$ and a cladding material 46 having an index of refraction $n_3$. FIG. 3a shows a side view of a typical low index difference waveguide, and FIG. 3b shows a cross-sectional view of the low index difference waveguide of FIG. 3a. Similarly, the high index difference waveguide, when used, includes a core material 44 having an index of refraction $n_2$ and a cladding material 46 having an index of refraction $n_3$. FIG. 4a shows a side view of a typical high index difference waveguide, and FIG. 4b shows a cross-sectional view of the high index difference waveguide of FIG. 4a. The index of refraction $n_3$ of the cladding material 46 is less than the index of refraction $n_1$ of the low index core material 42, which is less than the index of refraction $n_2$ of the high index core material 44.

In the embodiment of FIGS. 3a, 3b, 4a, 4b, the low index difference waveguides and the high index difference waveguides both have the same cladding material 46 surrounding their cores 42, 44, although in other embodiments different cladding materials can be used. As used throughout this specification, a low index difference waveguide is a waveguide where delta (Δ) for the index of refraction $n_1$ of the core material 42 and the index of refraction $n_3$ of the cladding material 46 is generally very small, such as less than 0.1 (10 percent). In other words:

$$\Delta=(n_1-n_3)/n_3<0.1.$$

In some embodiments, this index difference Δn is such that Δ is less than 0.01 (1 percent) or less than 0.04 (4 percent). A high index difference waveguide, on the other hand, is a waveguide where delta (Δ) for the index of refraction $n_2$ of the core material 44 and the index of refraction $n_3$ of the cladding material 46 is at least 0.1. In other words:

$$\Delta=(n_2-n_3)/n_3>=0.1.$$

In other embodiments, the index difference Δn is such that Δ for a high index difference waveguide is at least 0.2, and for still other embodiments, Δ is at least 0.3.

If a low index difference waveguide is used as the large mode size waveguide 22 for an input/output port, the index of refraction $n_1$ of the core material 42 and the index of refraction $n_3$ of the cladding material 46 are chosen so that the low index difference waveguide 22 has an effective index of refraction and mode size close to that of the external optical fiber 28. The external optical fiber 28, much like a low index difference waveguide, includes a core material surrounded by a cladding material. The core material of the optical fiber 28 can have a square, rectangular, elliptical, or circular cross-section or, in other embodiments, an arbitrary cross-section can be used. In one embodiment, the same geometry and indices of refraction can be chosen for the low index difference waveguide on the substrate 20 as are used for the external optical fiber 28. The coupling loss between the external optical fiber 28 and the low index difference waveguide 22 is minimized by matching the mode size of the low index difference waveguide to that of the external optical fiber 28. In addition, reflection is minimized by matching the effective index of refraction of the low index difference waveguide to that of the external optical fiber 28. Both of the large mode size waveguides 22 of FIG. 2 are used for input/output ports. In other embodiments, such as that shown in FIG. 5, some large mode field size waveguides 22 are not input/output ports, but instead are connected to or contain optical functions. These large mode field size waveguides 22 that are not used for input/output, do not need to have mode sizes to match external fiber; instead, these large mode size waveguides 22 can have differing mode sizes chosen for particular optical functions. A mode transformer can be used to alter mode sizes for these large mode size waveguides.

In one embodiment where low index difference waveguides are used, the indices of refraction $n_1$, $n_3$ of the low index core 42 and the cladding material 46 are chosen so that the low index difference waveguide has a mode field 1/e diameter size of at least 2 microns. The mode field 1/e diameter (the mode size) is the diameter of the mode where the optical field amplitude is 1/e of the peak optical field amplitude. In this embodiment, the core material 42 and the cladding material 46 are chosen to make the mode field 1/e diameter size large enough to maximize the coupling throughput and error tolerance with the external optical fiber 28.

To design a waveguide by mode size, the following procedure can be used. For a particular selection of refractive indices $n_1$, $n_3$ and for a certain wavelength of light that will propagate through the waveguide, the dimensions of the waveguide can be selected to be less than or equal to the single mode cut-off dimension, and this dimension determines the mode size. The lower limit of the mode field 1/e diameter size of about 2 microns, therefore, ensures that the mode field 1/e diameter size of the low index difference waveguide, when used, will remain large enough to effectively couple to external optical fibers 28. In other embodiments, this lower limit of the mode field 1/e diameter can be about 3 microns or, in still other embodiments, 5 microns. Typical optical fiber waveguides have mode field 1/e diameter sizes of about 8–10 microns. In one embodiment, therefore, the low index difference waveguide 22 can have a mode field 1/e diameter size of about 8–10 microns. An upper range of the mode field 1/e diameter size of the low index difference waveguide 22 can be the largest mode field 1/e diameter size typically used for external optical fibers 28. In one embodiment, such an upper range for the mode field 1/e diameter size can be about 15–20 microns, although this upper mode field 1/e diameter size can vary widely.

Throughout this specification, a large mode field size waveguide (or large mode size waveguide) is a waveguide that has a mode field 1/e area similar to that of a waveguide having a mode field 1/e diameter of at least 2 microns. In such an embodiment, for instance, the mode field 1/e area would be π square microns. Similarly, in an embodiment where the mode field 1/e diameter is 3 microns, the mode field 1/e area would be about 2.25 π square microns. More particularly, a large mode field size waveguide could have a mode field 1/e area of about 16π square microns (for an 8 micron mode field 1/e diameter) or 25π square microns (for a 10 micron mode field 1/e diameter). Such a large mode field size waveguide having an 8–10 micron diameter can include optical fiber. A large mode field size waveguide can be a waveguide of any configuration, including but not limited to a channel waveguide.

In one embodiment, as mentioned above, the large mode field size waveguide 22 on the substrate 20 can be a low index difference waveguide 22. The low index difference waveguide 22 can have a core material 42 made from doped silica and a cladding material 46 made from silica. If the low index difference waveguide 22 is used for an input/output port for the optical chip, a blunt connection or coupler of any variety can be used to connect the external optical fiber 28 to the low index difference waveguide 22 on the substrate 20. For instance, an end of the optical fiber 28 can be abutted to an end of the low index difference waveguide 22, and these two ends can be adhered together. Because the material and design of the low index difference waveguide 22 can be chosen to match the external optical fiber 28, a low coupling loss, such as about 1 decibel (dB) or less, can result between the external optical fiber 28 and the low index difference waveguide 22. The external optical fiber 28 shown in FIG. 2 can be replaced by any low index difference waveguide, and not only the optical fiber 28 shown in the Figures. The external optical fiber 28 could therefore represent an input or output from another optical chip on a substrate or could be any other optical device.

The low minimum bending radius waveguide 24 allows for the miniaturization of optical functions 26 on the substrate 20. A small optical chip with a large number of optical functions 26 can therefore result. Because low minimum bending radius waveguides have smaller bending radii than large mode size waveguides and low index difference waveguides, optical functions 26 and bending and splitting of propagating light can be implemented in smaller areas using these low minimum bending radius waveguides. A "minimum bending radius" can be defined as the radius for a 90 degree bend in which the loss during the bend is less than or equal to a certain amount, such as 0.5 dB in one embodiment. In other embodiments, a minimum bending radius can be for a loss of less than or equal to 0.1 dB in a 90 degree turn or, in still other embodiments, a loss of less than or equal to 0.01 dB in a 90 degree turn. Throughout this specification, the term "low minimum bending radius" will be used to refer to a radius of less than or equal to 50 microns for a 90 degree bend in which the loss during the bend is less than or equal to 0.5 dB. As an example, the minimum bending radius for a high index difference waveguide having a delta (Δ) of 0.3, $n_{cladding}$ of 1.5, and having a 1 micron by 1 micron core dimension can be less than or equal to 50 microns and, in other embodiments, less than or equal to 20 microns, and in still other embodiments, less than or equal to 10 microns. Such a waveguide is a low minimum bending radius waveguide. As another example, the minimum bending radius for a low index difference waveguide where Δ is 0.01, $n_{cladding}$ is 1.5, and having a 10 micron by 10 micron core dimension is on the order of 1 cm. Such a waveguide is not a low minimum bending radius waveguide.

The use of low minimum bending radius waveguides on the optical chip allows for the integration of a large number of optical functions 26 on a single substrate 20. The optical functions 26 and low minimum bending radius waveguides 24 on the substrate 20 communicate with external optical fibers 28, chips, or optical devices through at least one of the large mode field size waveguides 22 on the substrate 20. As noted above, at least some of the optical functions are performed in large mode size waveguides. As such, the portions of light paths in large mode field size waveguides 22 will require greater space than portions in low minimum bending radius waveguides 24. It is, however, desirable to perform certain optical functions in large mode field size waveguides 24. The use of low minimum bending radius waveguides 24 for bends and/or splits, however, still allows for miniaturization of the optical chip, even though large mode field size waveguides 22 are used for at least one optical function. In some embodiments (not shown), certain optical functions on the optical chips can be performed in low minimum bending radius waveguides 24 and other optical functions can be performed in the large mode field size waveguides 22.

Figure 5:
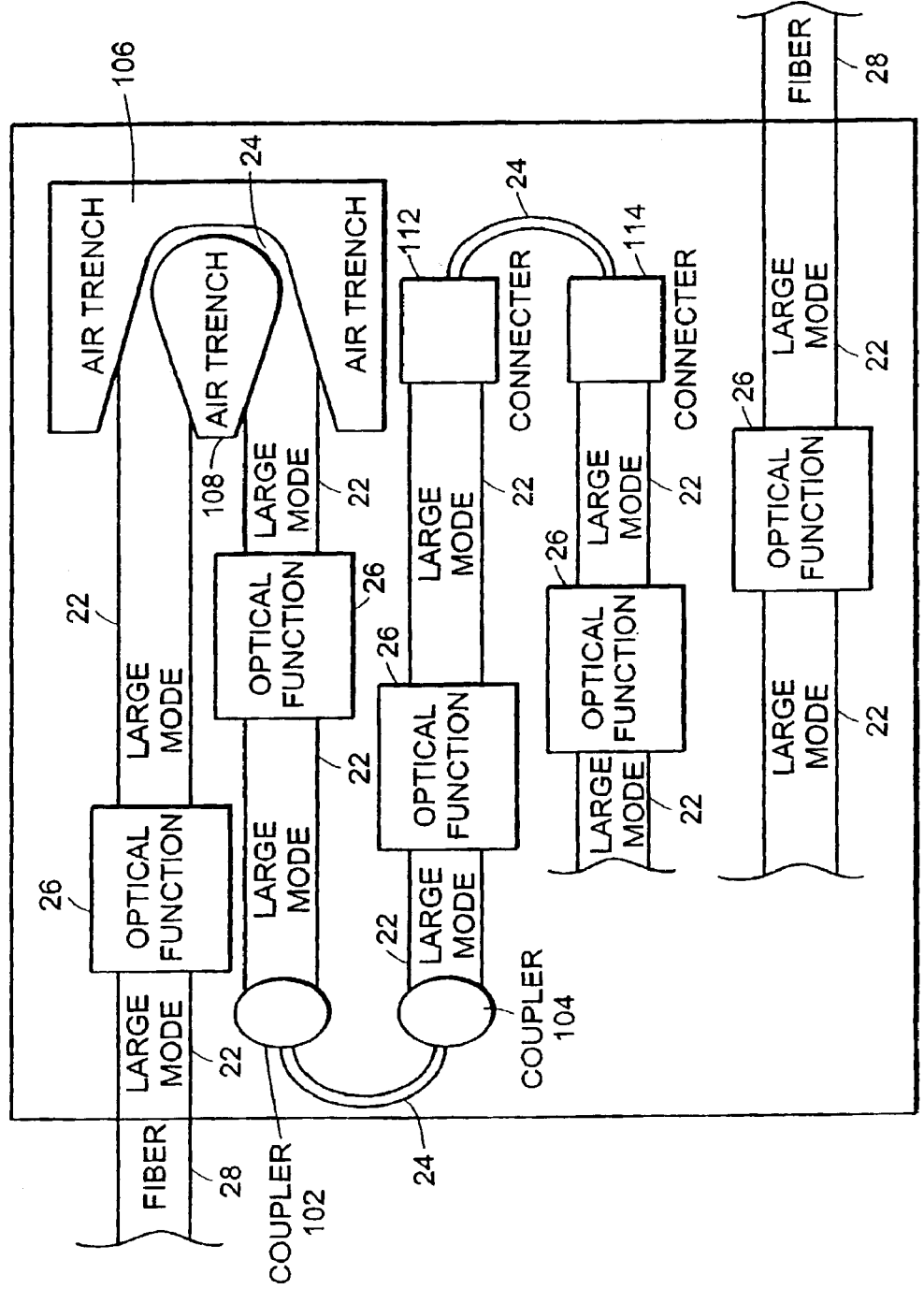
FIG. 5 is a block diagram of an optical chip according to a second embodiment of the invention.

In some embodiments of the invention, a single optical function can be split into multiple pieces, with the pieces separated by low minimum bending radius waveguides. A single optical function that requires a long length can therefore be performed in multiple segments separated by bends. An amplifier is one exemplary optical function that can be split into multiple pieces separated by bends. Referring to FIG. 5, each of the five optical functions 26 shown could be pieces of a single optical function in this embodiment. A modulator is another optical function that can be realized in this embodiment.

Referring again to FIG. 2, the optical chip can contain more than one input or output low index difference waveguides 22. In FIG. 2, for instance, a first low index difference waveguide 22 provides for a first input/output port from the optical chip, and a second low index difference waveguide 22 provides for a second input/output port from the optical chip. The particular design of the optical chip depends on the application for which the optical chip will be used.

The optical chip of FIG. 2 need not be connected to an external optical fiber 28. Instead, an optical connection can be made between one of the large mode field size waveguides 22 on the substrate 20 and an external chip (not shown in Figures) rather than an external optical fiber 28. The large mode field size waveguide 22 on substrate 20 can therefore directly connect to an external chip or to an external optical fiber 28. A large mode field size waveguide on an external chip can be used to couple with the large mode size waveguide 22 on the substrate 20. In another embodiment, an emitting/receiving function on the external chip can be optically connected to the large mode field size waveguide 22 on the substrate 20.

In operation of the embodiment of FIG. 2, light pulses enter the optical chip through the optical fiber 28 on the left hand side of the figure. An optical function can then be performed in the large mode field size waveguide 22 on the optical chip. Bending with low loss can then be achieved in the low minimum bending radius waveguide 24. Eventually, the light pulse can exit the optical chip through the large mode field size waveguide 22 to the optical fiber 28 on the right hand side of FIG. 2. It should be noted that the optical path can be bi-directional, and can therefore be the reverse of that described above. In addition, some optical chips might not contain both inputs and outputs.

FIG. 5 depicts a second embodiment of an optical chip according to the invention. In this embodiment, it is clear that the low minimum bending radius waveguides 24 are used for bends in the light path and that a large number of optical functions 26 can be implemented in the large mode field size waveguides 22. Five optical functions 26 are shown in the embodiment of FIG. 5, and the cut-out portion indicates that a large additional number of optical functions 26 and bends can be included. As will be discussed in greater detail below, FIG. 5 also illustrates different types of couplers that can be used in accordance with the invention.

The optical chips described above can also be part of a larger subsystem. For instance, such a subsystem could include one of the optical chips described above connected to an external large mode field size dielectric waveguide. The optical chip in such an embodiment could include a low minimum bending radius waveguide used for a bend and/or split, a large mode field size waveguide, and an optical function connected to the large mode field size waveguide. The external large mode field size dielectric waveguide, in this embodiment, would be external to the optical chip and would be optically coupled to the large mode field size waveguide on the optical chip. Such a subsystem including an optical chip and an external large mode field size dielectric waveguide, one example of which can be a module, could be used in a number of applications, including those described below.

The optical chips described above can be used for a variety of applications, including passive or active applications. In one embodiment, the optical chips described above can be used for amplification functions. For some amplifiers, it is desirable to amplify in large mode field size waveguides. The length of waveguide required for some amplification functions, however, is large. For example, some amplifiers can require up to 10 meter waveguide lengths for proper amplification. If the amplifier is broken up into pieces and each piece is used as an optical function in the embodiments above, the footprint of the optical chip containing such an amplifier can be reduced and the shape of the chip can be changed. Because low minimum bending radius waveguides are used for bends between the amplifier optical functions, little space is required for waveguide bends. Although a significant waveguide length can still be required for proper amplification, pieces of this waveguide length can be tightly integrated on the optical chip through the use of the low minimum bending radius waveguides.

A compact modulator can also be built based on the optical chip described above. Large mode size waveguides based on Lithium Niobate are typically used for light modulation. Titanium doping is used to define the core in a Lithium Niobate substrate. The index difference between the core (Titanium doped Lithium Niobate) and the cladding (Lithium Niobate) is small, which makes the waveguide a large mode size waveguide with a large minimum bending radius. For a useful modulation function based on this technology, a long waveguide length can be helpful. If the modulator is broken up into pieces and each piece is used as an optical function in the embodiments above, the footprint of the optical chip containing such a modulator can be reduced. Because low minimum bending radius waveguides are used for bends between the modulator optical functions, little space is required for waveguide bends. Although a significant waveguide length can still be required for proper modulation, pieces of this waveguide length can be tightly integrated on the optical chip through the use of the low minimum bending radius waveguides. Several embodiments of modulators, especially those which change phase modulation into amplitude modulation of the optical signal (e.g. Mach Zehnder), have extremely long interconnection pathways. These long pathways are a result of the use of large mode size waveguides to perform the splitting and routing functions. Low minimum bending radius waveguides can be used to perform the splitting and routing functions to reduce the footprint of the optical chip.

Another application of the optical chips described above can be in cross-connects. In cross-connect applications, it can be difficult to cross light without interference in high index difference waveguides. It can therefore be desirable to perform cross-connecting functions in large mode field size waveguides. The integration of a cross-connect network on an optical chip can be decreased in size by using low minimum bending radius waveguides for bends and/or splits. As such, the resulting optical chip can perform the cross-connecting function in a relatively small footprint.

The optical chips described above can incorporate other popular current technology, such as splitters, couplers, switches, filters, isolators, detectors, interference device, Multi-Mode Interferometer, Mach-Zehnder Interferometer, arrayed waveguide grating, switch, MEMS device, lasers, detectors, micro-resonators, polarization rotator, dispersion compensation device, polarization compensation device, polarization splitter, phase delay lines, and time delay lines as basic building blocks of functionality. Together with other devices, subsystems on a single optical chip, including both passive and action applications, can be implemented.

As described above, the substrate 20 contains at least one large mode size waveguide 22 and at least one low minimum bending radius waveguide 24. In order to use a low minimum bending radius waveguide 24, the mode of the light can be transformed from the mode of the large mode field size waveguide 22 and the low index difference optical waveguide function 26 to that of the low minimum bending radius waveguide 24. To accomplish this mode transformation, a number of devices can be used. In one embodiment, a coupler, mode transformer, or optical connector can be used to optically connect the low minimum bending radius waveguide 24 to the large mode field size waveguide 22 used for the optical function 26. Two waveguides are "coupled" or "optically connected" if a change in one or more of the properties of an optical signal in one waveguide affects the properties of the optical signal in the second waveguide without an intermediate conversion to an electrical signal. Many optical couplers can be used in accordance with the invention. One such optical coupler is described in U.S. Pat. No. 6,253,015 to Ukrainczyk et al. FIG. 5 generally labels with numbers 112, 114 connectors that can be used to connect large mode field size waveguides 22 to low minimum bending radius waveguides 24.

Generally, it can be desirable to have the lowest possible loss in optical signal in the coupler between a first waveguide and a second waveguide. This coupling loss, for instance, can be about 1 decibel or less for an efficient coupler. For coupling of waveguides having similar mode sizes and refractive indices, simple coupling methods, such as abutting an end of one waveguide to an end of the other waveguide, can be used. When the mode sizes of waveguides differ, however, more complex couplers can be used.

One coupler that can be used is described in International Publication Number WO 02/05000, published Jan. 17, 2002, by Lee et al., and entitled "Mode Transformer Between Low Index Difference Waveguide and High Index Difference Waveguide." This publication describes a mode transformer that enables low-loss coupling between optical modes of two waveguides with different index differences. Such a coupler can be used at both ends of the low minimum bending radius waveguide 24 so that the mode is coupled from the large mode field size waveguide 22 to the low minimum bending radius waveguide 24 with a first coupler, and then the mode is transformed from the low minimum bending radius waveguide 24 to the large mode field size waveguide 22 with a second coupler. FIG. 5, for instance, shows two couplers 102, 104 attached at ends of a low minimum bending radius waveguide 24 used for a bend.

In another embodiment, mode transformation and small bending radii can be achieved using tapered air trenches. FIG. 6 depicts such a tapered air trench approach. In such an approach, the core 202 of the waveguide is surrounded by cladding 200 at a first location. As the waveguide approaches the bend, the core tapers, as indicated by tapered portion 204. As the core 202 tapers, air trenches 212, 214 are introduced around the tapered portion 204. The air has a lower index of refraction than the cladding 200. The core 202, which has been narrowed by the tapered portion 204, therefore becomes part of a waveguide with a higher index difference than the untapered core 202 surrounded by the cladding 200. After a bend in the waveguide, a similarly tapered portion 208 surrounded by the air trenches 212, 214 forms the core 210 of a large mode size waveguide. The air trench approach of FIG. 6, therefore, alters a large mode size waveguide to a low minimum bending radius waveguide and then back to a large mode size waveguide after a bend. FIG. 5 also shows tapered air trenches 106, 108 between two large mode field size waveguides that are used to achieve a low minimum bending radius waveguide between the two large mode field size waveguides Large mode size waveguides are particularly useful for applications for which low numerical aperture (NA) is needed. The low NA in large mode size waveguides implies that optical beam divergence angles are small. Large mode size waveguides are therefore particularly suited for any devices for which hybrid integration is needed. Low NA waveguides are particularly useful for connecting to any functions that need to be bonded or any functions for which connecting to waveguides is difficult or impossible. One example is a MEMS switch, where a MEMS switching device is inserted into a trench that is built in the low index waveguide.

Another application of the optical chips described above can be in waveguide crossings. In waveguide crossings, two or more waveguides that are not co-linear cross in the same plane. For waveguide crossings, it can be difficult to cross light without interference in high index difference waveguides due to the large optical beam divergence angles. It can therefore be desirable to perform waveguide crossing functions in large mode field size waveguides, such as low index difference waveguides. The integration of waveguide crossing networks on an optical chip can be decreased in size by using low minimum bending radius waveguides for bends and/or splits in waveguides. As such, the resulting optical chip can perform the waveguide crossings in a relatively small footprint.

FIGS. 7a–7c schematically show optical waveguide crossings. FIG. 7a shows a waveguide crossing for two large mode size waveguides (low NA waveguides). In such a waveguide crossing, as shown in FIG. 7a, light entering from the left will couple from waveguide 301 efficiently into waveguide 302 if waveguides 301, 302 are large mode size waveguides. Very little light will couple into waveguides 303, 304 in such an embodiment using large mode size waveguides due to the small divergence angles within the waveguides. Similarly, light entering waveguide 303 will couple efficiently into waveguide 304 with very little light diverging into waveguides 301, 302.

FIG. 7b shows a waveguide crossing for two low minimum bending radius waveguides (high NA waveguides). As shown in FIG. 7b, light traveling from left to right in waveguide 311 will couple into waveguide 312, but some discernable amount of light (denoted by the phantom arrows in FIG. 7b) will also couple into waveguides 313, 314. There will be some significant amount of cross talk when the crossing between waveguides 311, 312 is performed. Due to the larger divergence angles of light within low minimum bending radius waveguides, such waveguides do not work as well as large mode size waveguides for waveguide crossing applications.

FIG. 7c shows one implementation of a waveguide crossing. FIG. 7c shows a crossing where light from waveguide 321 should pass into waveguide 322 and where light from waveguide 323 should pass into waveguide 324. In the embodiment of FIG. 7c, waveguides 321, 322, 323, 324 are all high index difference waveguides that can be used for bends and/or splits on the optical chip. In order to perform a waveguide crossing for such high index difference waveguides, a connector 300 is used to couple each high index difference waveguide 321, 322, 323, 324 to a low index difference waveguide 331, 332, 333, 334. The connector 300 can be any coupler, mode transformer, or optical connector, such as those described above, that can be used to connect the high index difference waveguides 321, 322, 323, 324 to the low index difference waveguides 331, 332, 333, 334. As such, the waveguide crossings will be performed in the low index difference waveguides 331, 332, 333, 334.

Other optical functions that can better be implemented using large mode size waveguides rather than low minimum bending radius waveguides include functions that require maintenance of phase and/or low loss over long distances. Examples of such functions include large channel count Wavelength Division Multiplexing (WDM) multiplexors and demultiplexors, such as AWG or Echelle gratings.

Figure 8:
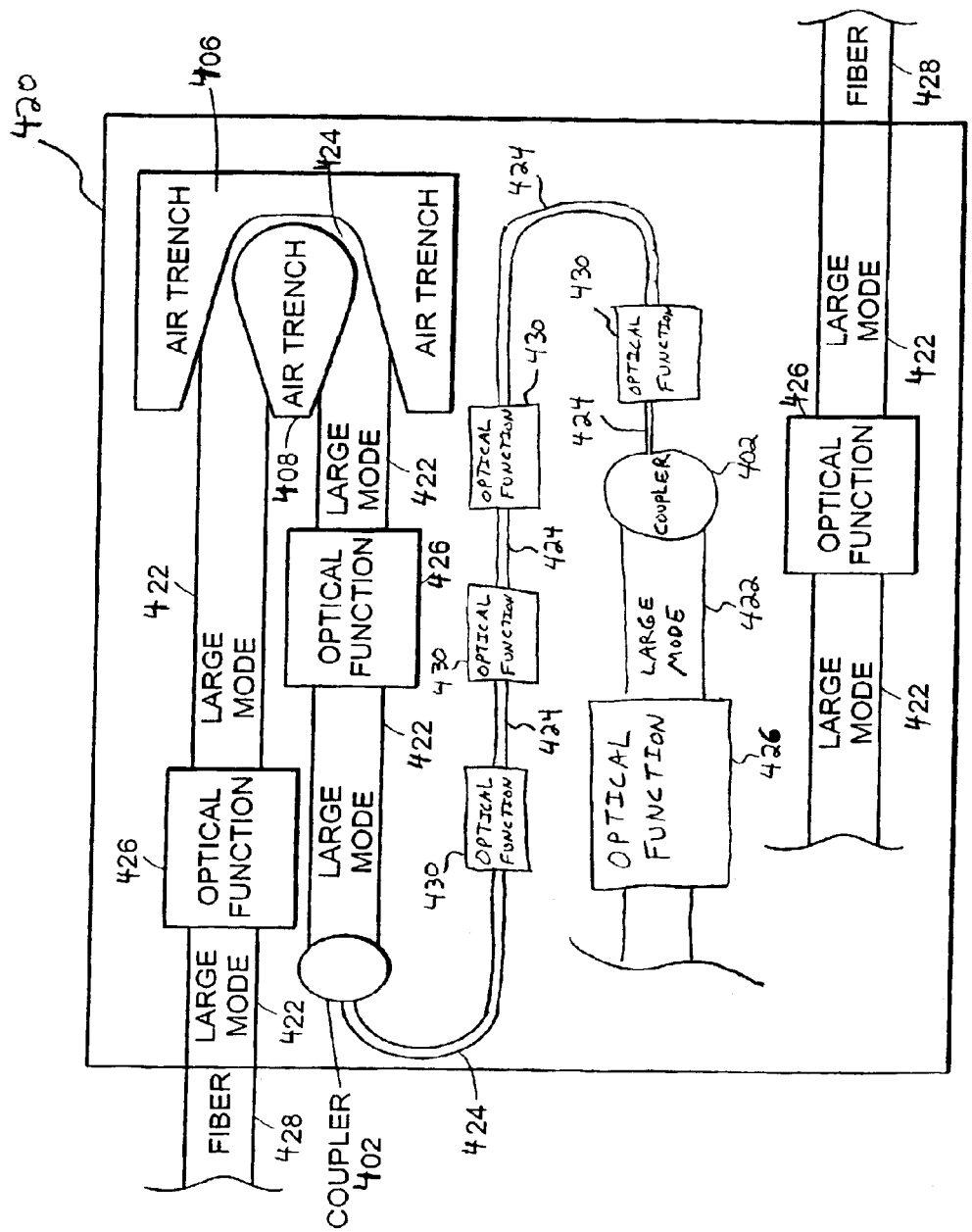
FIG. 8 depicts an embodiment of the invention in which at least one optical function is performed in a large mode field size waveguide and at least one optical function is performed in a low minimum bending radius waveguide on one optical chip.

FIG. 8 depicts an embodiment of the invention in which at least one optical function is performed in a large mode field size waveguide and at least one optical function is performed in a low minimum bending radius waveguide on one optical chip. In the depicted embodiment of FIG. 8, four optical functions 426 are performed in large mode field size waveguides 422, and four optical functions 430 are performed in low minimum bending radius waveguides 424. In other embodiments (not shown), two optical functions can be on the optical chip—one optical function performed in a low minimum bending radius waveguide and another optical function performed in a large mode field size waveguide. As in the embodiment of FIG. 5, low minimum bending radius waveguides 424 are used for bends in the light path, and couplers 402 or air trenches 406, 408 are used to connect the large mode field size waveguides 422 to the low minimum bending radius waveguides 424 on the substrate 420. Eight optical functions 426, 430 are shown in the embodiment of FIG. 8, and the cut-out portion indicates that a large additional number of optical functions 426, 430 and bends can be included.

In general, in the embodiment of FIG. 8, at least one optical function 426 in a large mode field size waveguide 422 and at least one optical function 430 in a low minimum bending radius waveguide 424 can be integrated monolithically on a single substrate 420. FIG. 8 depicts only a single light path (with a cut-out portion). The substrate 420 of FIG.

8 can, in other embodiments, have multiple paths of light, including paths that do cross and paths that do not cross. In such an embodiment, each path can have at least one optical function 426 in a large mode field size waveguide 422 and at least one optical function 430 in a low minimum bending radius waveguide 424, or, in another embodiment, only optical functions 426 in large mode field size waveguides 422 or only optical functions 430 in low minimum bending radius waveguides. In addition, the layout of optical functions 426, 430 can vary from application to application. The combination of optical functions 426, 430 in large mode field size waveguides 422 and low minimum bending radius waveguides 424 allows for the miniaturization of an optical chip, while still allowing optical functions 426 that are best performed in large mode field size waveguides 422 to be performed in those waveguides 422.

Figure 9:
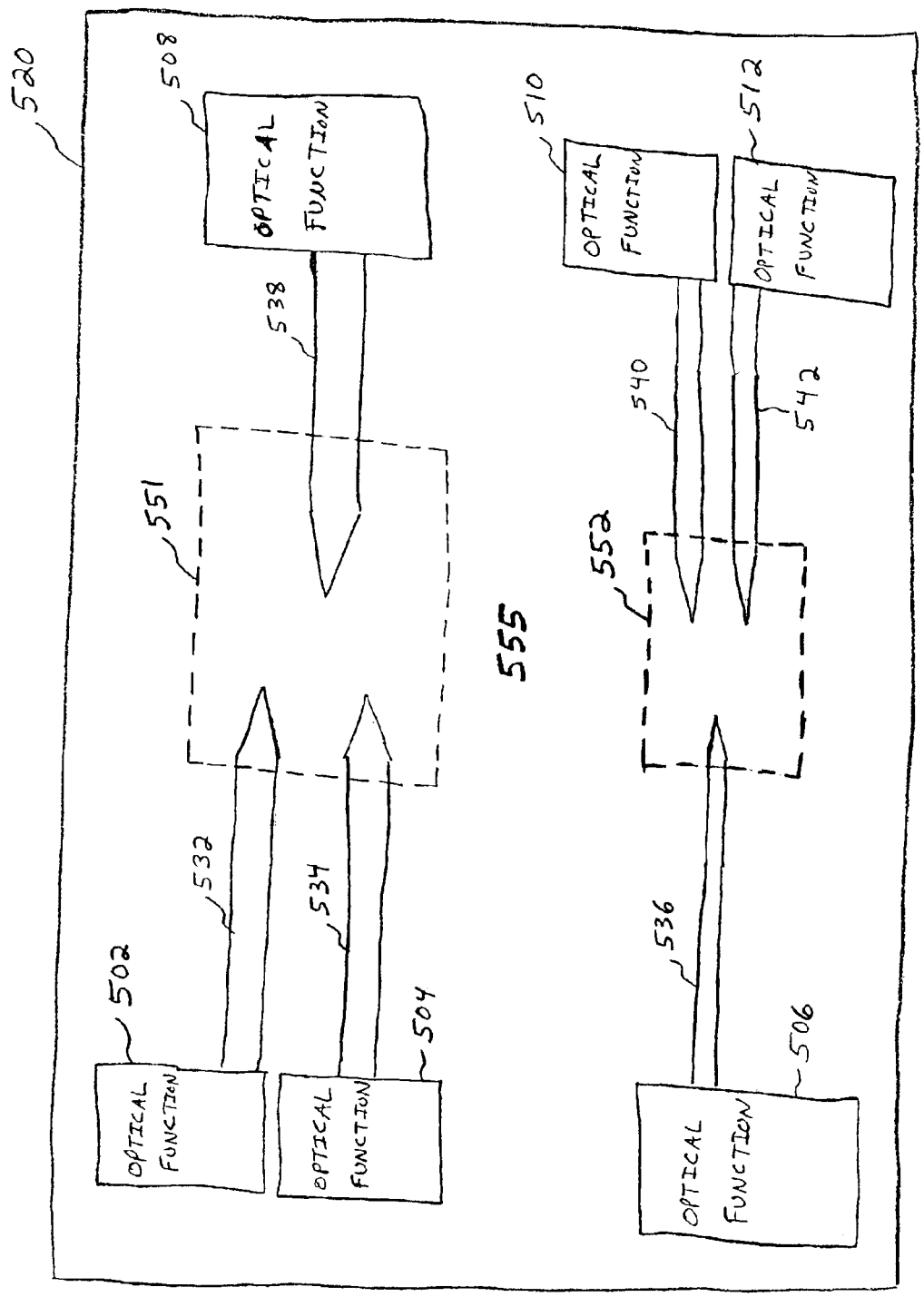
FIG. 9 depicts an embodiment of the invention in which the optical chip is programmable.

FIG. 9 depicts another embodiment of the invention in which the optical chip is programmable. In the embodiment of FIG. 9, the substrate 520 contains a number of optical functions 502, 504, 506, 508, 510, 512. Although FIG. 9 depicts six such optical functions 502, 504, 506, 508, 510, 512, a larger or smaller number of optical functions can exist on the substrate 520. The substrate 520 also contains low minimum bending radius waveguides 532, 534, 536, 538, 540, 542, which can be high index difference waveguides, that extend from each of the optical functions 502, 504, 506, 508, 510, 512. Although FIG. 9 depicts each optical function 502, 504, 506, 508, 510, 512 connected to a low minimum bending radius waveguide 532, 534, 536, 538, 540, 542, in other embodiments, optical functions on the substrate 520 can be connected to large mode field size waveguides, such as low index difference waveguides. Some of the optical functions 502, 504, 506, 508, 510, 512 can be performed in high index difference waveguides, and others of the optical functions 502, 504, 506, 508, 510, 512 can be performed in low index difference waveguides. FIG. 9 shows that the low minimum bending radius waveguides 532, 534, 536, 538, 540, 542 are not optically connected to each other, but instead are interrupted by a photosensitive layer 551, 552. In other embodiments (not shown), some optical functions on the substrate 520 can be connected to each other by either low minimum bending radius or large mode field size waveguides, rather than being interrupted by a photosensitive layer 551, 552 as are each of the waveguides 532, 534, 536, 538, 540, 542 shown in FIG. 9.

In general, the programmable chip shown in FIG. 9 allows one optical chip to be programmed specifically for different applications. For instance, optical function 502 could be connected through waveguides 532 and 538 to optical function 508 for one application. For a different application, optical function 504 could be connected through waveguides 534 and 538 to optical function 508. The photosensitive layer 551 can be tuned as described in more detail below to provide for the desired connection. Similarly, optical function 506 can be connected through waveguides 536 and 540 to optical function 510 for one application, and optical function 506 can be connected through waveguides 536 and 542 to optical function 512 for a second application. The tuning of photosensitive layer 552 would determine whether optical function 506 is connected to optical function 510, optical function 512, or to no other optical function.

A programmable chip, such as that described above, can be useful in a number of ways. As an example, a programmable chip can decrease manufacturing costs by providing for a series of standard photolithographic steps to attain a programmable chip, which can then be quickly tailored for specific applications.

The photosensitive layers 551, 552 can be tuned to selectively couple waveguides in order to customize the optical chip. In general, the photosensitive layers 551, 552 are made from a material(s) that is photosensitive and that, prior to exposure, has an index of refraction similar to or the same as the cladding layer 555 on the substrate 520. There will therefore be no waveguides that pass through the photosensitive layers 551, 552 in this embodiment. Portions of the photosensitive layers 551, 552 can then be exposed to light of an appropriate wavelength so that the index of refraction of those portions is adjusted upward or downward. Because the light can be locally focused to create a pattern on the photosensitive layers, a coupling device or waveguide connection between at least two of the waveguides 502, 504, 506, 508, 510, 512 can be created in the photosensitive layers 551, 552.

The photosensitive layers 551, 552 can be made from a variety of materials that are photosensitive. One such material is Ge-doped SiON. Ge doping in SiON can be achieved through conventional methods. One method is to mix a Ge-containing precursor with other precursors used to create SiON in a chemical vapor deposition (CVD) process, in particular plasma-enhanced CVD and low-pressure CVD. For example, Ge-doped SiON films are deposited from a mixture of silane ($SiH_4$), germane ($GeH_4$), $N_2O$, and $NH_3$. Another method is to incorporate Ge in a sputtering process by using a Ge target as well as other targets used to deposit SiON. For example, targets containing varying amounts of Ge, Si, O and N can be used.

The photosensitive layers 551, 552 can therefore be made from germanium-doped silicon oxynitride (Ge:SiON) or germanium-doped silicon nitride (Ge:SiN). The relative amounts of oxygen and nitrogen can vary widely, dependent upon the desired refractive index of the material before and/or after exposure to irradiation. Thus, the relative atomic proportions of oxygen and nitrogen (O:N) of the SiON host can range from 99.9:0.1 O:N to 0.1:99.1 O:N. This represents a composition control of 0.1%, which is attainable using standard techniques. As the oxygen level approaches that found in silicon dioxide, the index falls and approaches the index for silica (1.45–1.5). Similarly, as the nitrogen level approaches that found in silicon nitride, the index rises and approaches that of silicon nitride ($\geq 2.0$). The index of silicon nitride can vary from 2.0 to ~3.5 by making the silicon nitride material silicon-rich. There is a continuous index range from that of SiN to amorphous silicon that can be used in one or more embodiments of the invention. Therefore, between silicon oxynitride and silicon nitride, an index range of 1.45 to 3.5 is made possible. The silicon oxynitride or silicon nitride host itself can be a doped host. For example, the host can include boron and/or phosphorus.

Germanium doping changes the refractive index of the SiON or SiN host. Although the index change due to germanium doping is relatively small compared to the large index range of SiON, this additional level of index control is another tool that can be used to achieve the desired refractive index. In one or more embodiments, the levels of O, N and Ge are selected to provide a material having a refractive index that closely approximates the desired index.

Modification or tuning of the refractive index of the photosensitive layers 551, 552 is accomplished by taking advantage of the photosensitivity of the Ge-doped SiON material. Ge:SiON and Ge:SiN are expected to exhibit excellent photosensitivity, thereby providing a level of refractive index control. UV irradiation at the absorption of a Ge-related defect increases the refractive index of the sample at longer wavelengths. While the change in the index is a function of the time and intensity of UV radiation exposure, the index change is expected to range from $10^{-3}$ to a few percent.

UV irradiation can be used to tune all or a portion of the photosensitive layers 551, 552. The photosensitive layers 551, 552 are patterned by selectively irradiating the area where the refractive index change is desired. The selective irradiation of UV light can be achieved by conventional methods. Exemplary methods include but are not limited to (1) irradiating UV light through a mask that contains areas which are transparent and opaque to UV light (2) steering (moving) a focused UV beam across the layer surface in the desired pattern (3) use of interference of multiple light beams to write a grating into the layer, and (4) diffraction. The Ge-doped photosensitive material can be one or more of $SiO_2$, SiON or SiN.

Figure 10:
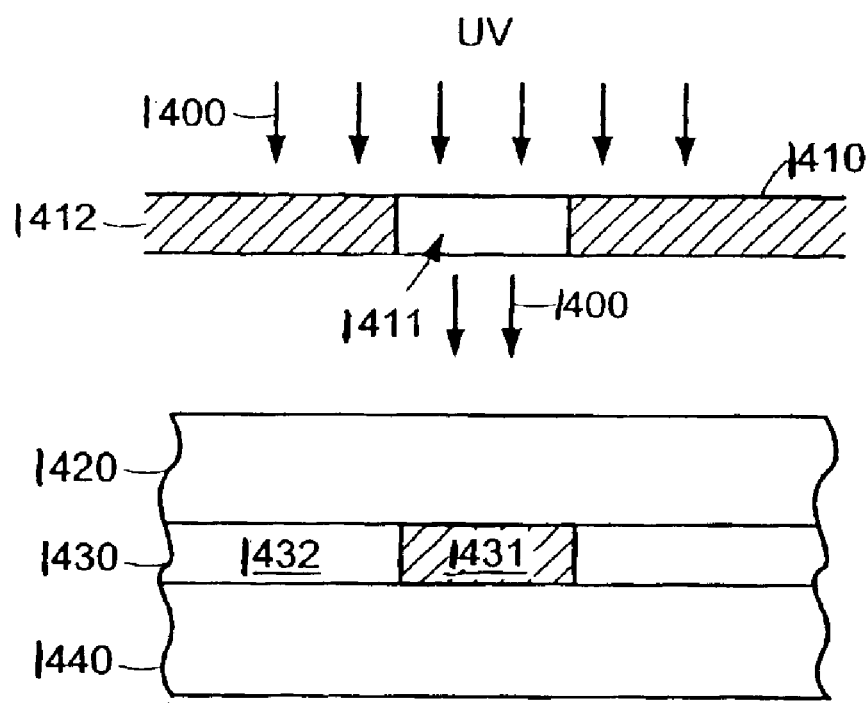
FIG. 10 shows waveguide core patterning according to one or more embodiments of the invention using a masking technique.

Waveguide core patterning according to one or more embodiments of the present invention using a masking technique is shown in FIG. 10. UV light 1400 is irradiated through a mask 1410 that contains a UV transparent area 1411 and UV opaque area 1412. UV light 1400 travels through the transparent region 1411 and selectively irradiates a portion 1431 of the photosensitive Ge:SiON layer 1430. The refractive index of only the irradiated area 1431 is altered to become a waveguide core whereas the non-irradiated region 1432 remains as cladding. In one or more embodiments, cladding layer 1420 (and optionally layer 1440) is transparent to UV energy, and is not UV-sensitive.

The UV irradiation can be provided by a UV laser or a UV lamp. The UV radiation is typically in the range of 220–390 nm, although other wavelengths of radiation can be used. The localization of the UV irradiation may be accomplished by focusing the light using some optical elements such as lens. However focusing is not required if the beam size is small enough for localized irradiation depending on specific applications.

Figure 11:
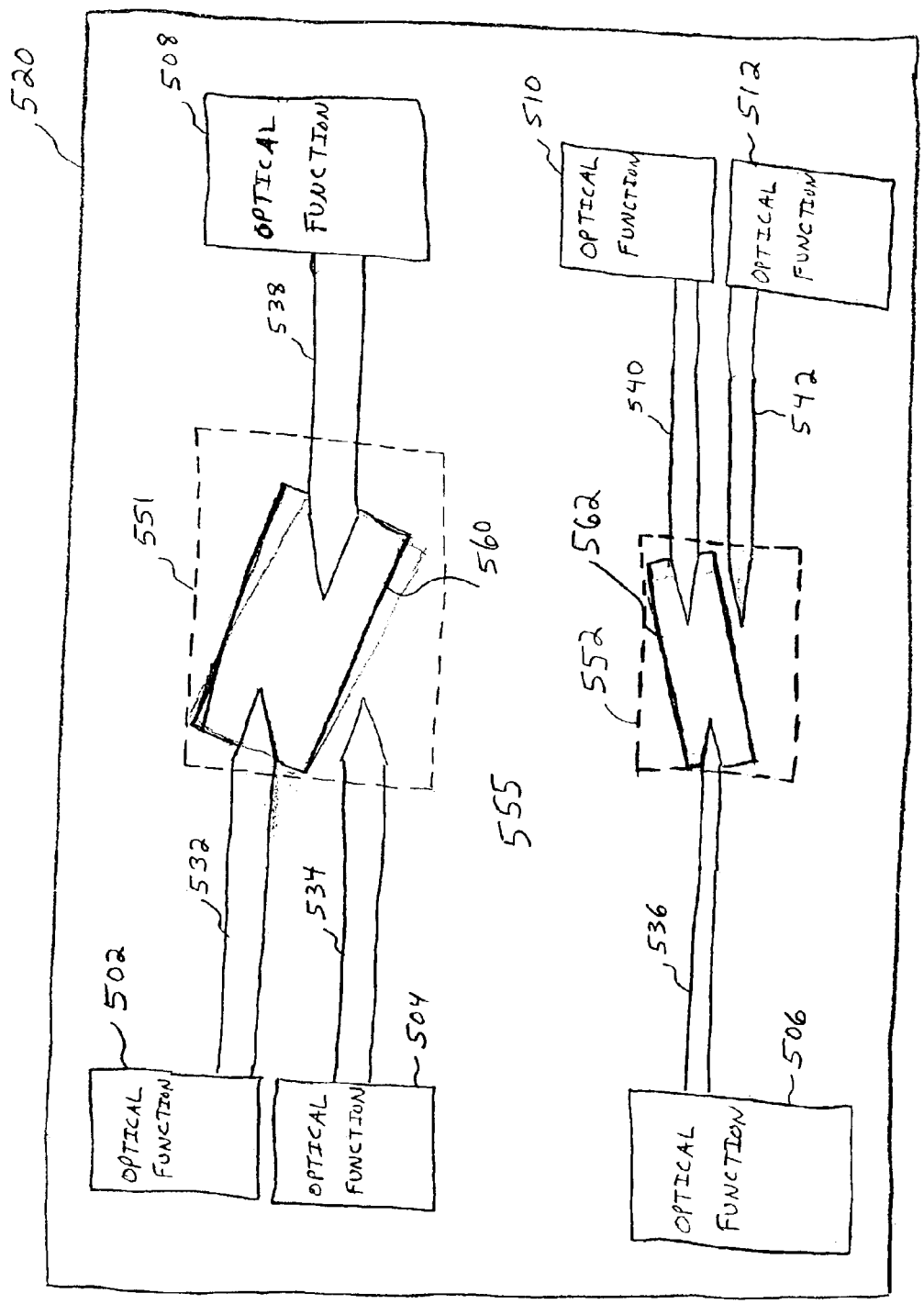
FIG. 11 shows one possible irradiation pattern of the programmable chip shown in FIG. 9.

Referring again to FIG. 9, the photosensitive layers 551, 552 can be irradiated as detailed above in order to couple the optical functions. FIG. 11 shows one possible irradiation pattern. In FIG. 11, photosensitive layer 551 has been selectively irradiated to form an optical connection between waveguide 532 and waveguide 538. Prior to exposure, the photosensitive layer 551 has a refractive index similar to that of the cladding 555, which can be made from $SiO_2$ in one embodiment. There is therefore no optical connection between waveguides 532, 534 and waveguide 538. In an embodiment in which waveguides 532, 534 are high index difference waveguides, the cores of these waveguides 532, 534 can be made from $Si_3N_4$. In an embodiment in which one or more of waveguides 532, 534 are low index difference waveguides, the cores can be made from $SiO_xN_y$. After exposure to irradiation in the pattern depicted, low index waveguide core 560 has been formed. Low index waveguide core 560 contains a slightly higher refractive index than the other portions of photosensitive layer 551, which has a refractive index similar to that of cladding 555. As such, a low index difference waveguide is formed from low index waveguide core 560 and cladding, which is formed from the unexposed portions of photosensitive layer 551 and possibly from the cladding layer 555. A coupling device therefore results. In particular, high index difference core 532 tapers into low index waveguide core 560. Similarly, high index core 538 tapers into low index waveguide core 560. As such, an optical coupling is created between high index core 532 and high index core 538. Low index waveguide core 562, similarly, has been formed by irradiation of photosensitive layer 552 to connect high index core 536 to high index core 540.

Figure 12:
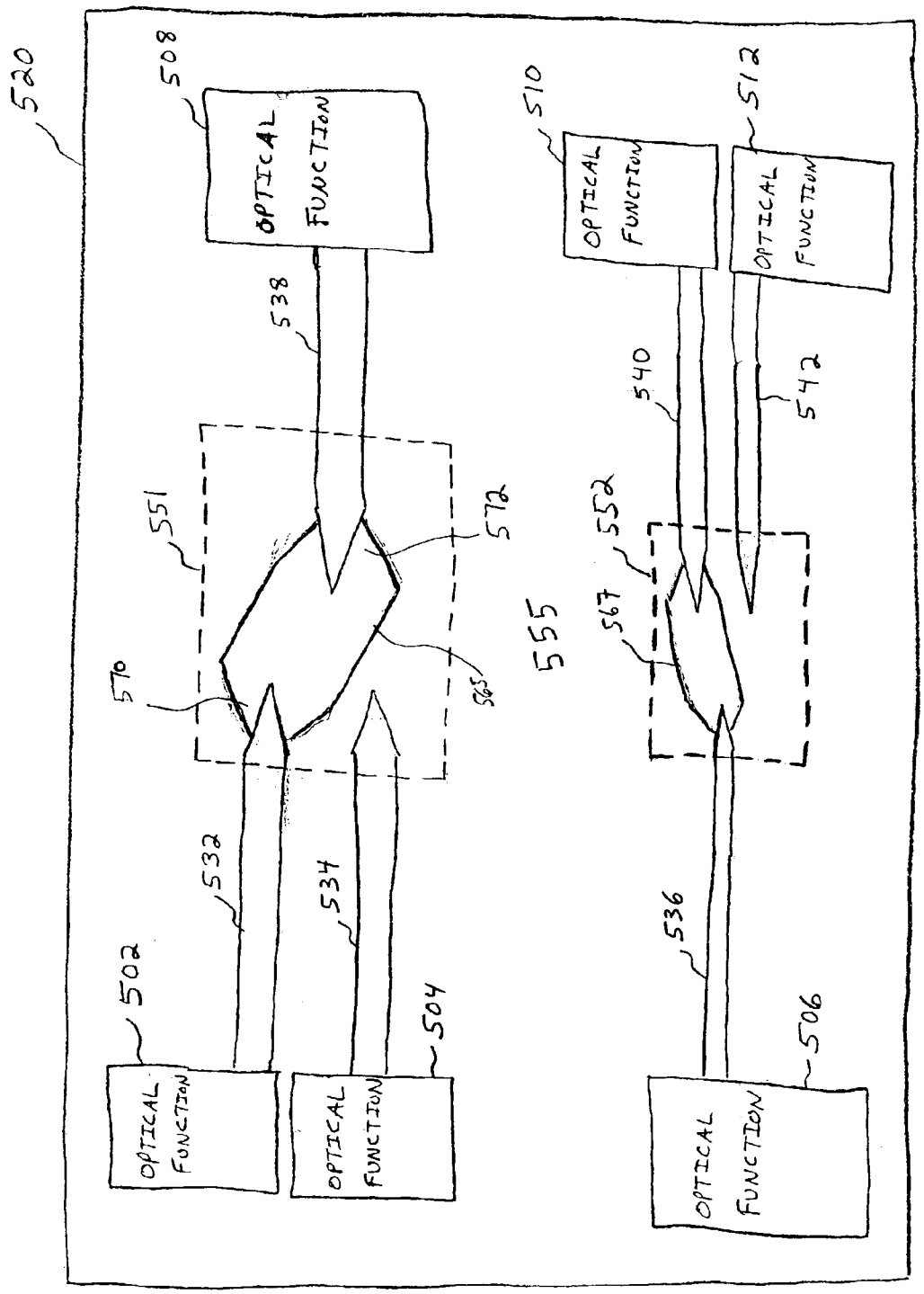
FIG. 12 shows a second possible irradiation pattern of the programmable chip shown in FIG. 9.

FIG. 12 shows a second possible irradiation pattern for the programmable optical chip 520. In the embodiment of FIG. 12, photosensitive layer 551 has been irradiated to form a low index portion 565 having a taper 570, 572 at each end. A coupler using a dual taper results; that is, a high index core having a taper that extends within a taper 570, 572 of the low index core results. One coupler that is similar is described in International Publication Number WO 02/05000, published Jan. 17, 2002, by Lee et al., and entitled "Mode Transformer Between Low Index Difference Waveguide and High Index Difference Waveguide." This publication describes a mode transformer that enables low-loss coupling between optical modes of two waveguides with different index differences. The low index difference portion 565 can form such a coupler in the embodiment of FIG. 12. In particular, high index core 532 embeds within low index difference portion 565, and high index core 538 embeds within low index difference portion 565 to couple optical function 502 to optical function 508. A similar low index portion 567 has been formed in photosensitive layer 552 to couple optical function 506 to optical function 510.

International Publication Number WO 02/05000 by Lee et al. is incorporated herein by reference to show one coupler or mode transformer that can be used in any of the embodiments of the invention set forth throughout this application to connect a first waveguide to a second waveguide.

In other embodiments of the invention, a photosensitive material that decreases in refractive index upon being exposed to irradiation can be used. In such an embodiment, a portion of the photosensitive layers 551, 552 defining a cladding of a low index difference waveguide could be irradiated to form an optical connection. The core of such a low index difference waveguide would be composed of the unexposed portion of the photosensitive layer 551, 552 in such an embodiment. In other embodiments, photosensitive layers could be simple on/off switches in which the entire photosensitive layer could be exposed to form a connection, but left unexposed to prevent a connection.

In other embodiments of the invention, a plurality of optical functions can be fabricated on an optical chip using conventional semiconductor fabrication methods. A coupling layer of Ge-doped photosensitive material can be deposited above, below or around the optical devices. In one or more embodiments, the regions surrounding the waveguide can be exposed to light so that its index is modified in a manner that creates the waveguide. In one or more steps, the photosensitive coupling layer is irradiated, thereby creating one or more optical connections among the optical chip devices. The method provides an accurate and efficient way of creating multiple connections among integrated optical devices on a chip.

In one or more embodiments of the present invention, decoupling and coupling of optical devices can be accomplished using any photosensitive material, for example, Ge-doped $SiO_2$, Ge-doped SiON and/or Ge-doped SiN, as well as photosensitive optical polymers.

Any references to front and back, right and left, top and bottom, upper and lower, and horizontal and vertical are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. An optical chip, comprising:
a first large mode field size waveguide and a second large mode field size waveguide, the first large mode field size waveguide crossing the second large mode field size waveguide in a common plane; and
at least one low minimum bending radius waveguide coupled to one of the first and second large mode field size waveguides, the low minimum bending radius waveguide being used for one of a bend and a split on the optical chip;
wherein the first large mode field size waveguide, the second large mode field size waveguide, and the low minimum bending radius waveguide are fabricated monolithically on a single substrate.

2. The optical chip of claim 1, further comprising a first optical function performed in the first large mode field size waveguide.

3. The optical chip of claim 2, further comprising a second optical function performed in the low minimum bending radius waveguide.

4. The optical chip of claim 2, further comprising a first optical function performed in the low minimum bending radius waveguide.

5. The optical chip of claim 1, wherein one of the first large mode field size waveguide and the second large mode field size waveguide has an interface for an external optical device.

6. The optical chip of claim 1, wherein the first large mode field size waveguide and the second large mode field size waveguide are low index difference dielectric waveguides, and wherein the low minimum bending radius waveguide is a high index difference dielectric waveguide.

7. An optical chip, comprising:
a plurality of large mode field size dielectric waveguides, at least one of the large mode field size dielectric waveguides being used to interface with an external optical device, and at least two of the large mode field size waveguides crossing in a common plane; and
a plurality of low minimum bending radius dielectric waveguides, at least one of the low minimum bending radius dielectric waveguides being coupled to one of the large mode field size waveguides crossing in the common plane and being used for a bend on the optical chip, and at least one of the low minimum bending radius dielectric waveguides being used to interconnect two or more of the large mode field size dielectric waveguides;
wherein the plurality of large mode field size dielectric waveguides and the plurality of low minimum bending radius dielectric waveguides are fabricated monolithically on a single substrate.

8. The optical chip of claim 7, further comprising a first optical function performed in one of the large mode field size dielectric waveguides.

9. The optical chip of claim 7, further comprising a first optical function performed in one of the low minimum bending radius dielectric waveguides.

10. The optical chip of claim 9, further comprising a second optical function performed in one of the large mode field size dielectric waveguides.

11. The optical chip of claim 7, wherein the large mode field size dielectric waveguides are low index difference dielectric waveguides, and wherein the low minimum bending radius dielectric waveguides are a high index difference dielectric waveguides.

12. An optical chip, comprising:
at least one large mode field size waveguide;
at least one low minimum bending radius waveguide coupled to the large mode field size waveguide; and
at least two optical functions including a first optical function performed in the large mode field size waveguide and a second optical function performed in the low minimum bending radius waveguide;
wherein the large mode field size waveguide, the low minimum bending radius waveguide, and the two optical functions are fabricated monolithically on a single substrate.

13. The optical chip of claim 12, wherein the low minimum bending radius waveguide is used for a bend on the optical chip.

14. The optical chip of claim 12, wherein the large mode field size waveguide has an interface for an external optical device.

15. The optical chip of claim 12, wherein each optical function is any structure that performs at least one of generating, modifying, and measuring at least one of the amplitude, frequency, wavelength, dispersion, timing, propagation direction, and polarization properties of one or more light pulses.

16. The optical chip of claim 12, wherein the large mode field size waveguide is a low index difference dielectric waveguide, and wherein the low minimum bending radius waveguide is a high index difference dielectric waveguide.

17. An optical chip, comprising:
a plurality of large mode field size dielectric waveguides, at least one of the large mode field size dielectric waveguides being used to interface with an external optical device;
a plurality of low minimum bending radius dielectric waveguides, at least one of the low minimum bending radius dielectric waveguides being used for a bend on the optical chip, and at least one of the low minimum bending radius dielectric waveguides being used to interconnect two or more of the large mode field size dielectric waveguides; and
a first optical function performed in one of the large mode field size dielectric waveguides; and
a second optical function performed in one of the low minimum bending radius dielectric waveguides;
wherein the plurality of large mode field size dielectric waveguides, the plurality of low minimum bending radius dielectric waveguides, the first optical function, and the second optical function are fabricated monolithically on a single substrate.

18. A programmable optical chip, comprising:
a first optical function;
a first waveguide core extending from the first optical function, the first waveguide core being surrounded by a cladding to form a first waveguide;
a second optical function;
a second waveguide core extending from the second optical function, the second waveguide core being surrounded by the cladding to form a second waveguide; and
a photosensitive layer disposed between the first waveguide core and the second waveguide core, the photosensitive layer having a refractive index similar to that of the cladding prior to exposure to irradiation, wherein the photosensitive layer is capable of changing refractive index upon exposure to irradiation to selectively form an optical connection between the first waveguide and the second waveguide;

wherein the first waveguide, second waveguide, first optical function, second optical function, and photosensitive layer are fabricated on a single substrate.

19. The programmable optical chip of claim 18, wherein, prior to exposure to irradiation, the photosensitive layer does not form an optical connection between the first waveguide and the second waveguide.

20. The programmable optical chip of claim 18, wherein the first and second optical functions are any structures that perform at least one of generating, modifying, and measuring at least one of the amplitude, frequency, wavelength, dispersion, timing, propagation direction, and polarization properties of one or more light pulses.

21. The programmable optical chip of claim 18, wherein the first and second waveguides are high index difference waveguides and wherein at least a portion of the photosensitive layer becomes a low index difference waveguide core upon exposure to irradiation.

22. The programmable optical chip of claim 21, wherein the index of refraction of the photosensitive layer increases upon exposure to irradiation.

23. The programmable optical chip of claim 22, wherein the first waveguide core and the second waveguide core each have a taper at an end adjacent to the photosensitive layer.

24. The programmable optical chip of claim 23, wherein a first coupler is formed between the first waveguide and the photosensitive layer upon exposure to irradiation of the photosensitive layer, and wherein the taper of the first waveguide core is at least partially surrounded by the exposed photosensitive layer.

25. The programmable optical chip of claim 23, wherein a second coupler is formed between the second waveguide and the photosensitive layer upon exposure to irradiation of the photosensitive layer, and wherein the taper of the second waveguide core is at least partially surrounded by the exposed photosensitive layer.

26. The programmable optical chip of claim 22, wherein the photosensitive layer is made from germanium-doped silicon oxynitride or germanium-doped silicon nitride.

27. The programmable optical chip of claim 26, wherein the cladding is made from $SiO_2$ and the first and second waveguide cores are made from $Si_3N_4$.

28. The programmable optical chip of claim 18, wherein the first optical function is performed in a low index difference waveguide and at least a first portion of the first waveguide adjacent to the first optical function is a low index difference waveguide.

29. The programmable optical chip of claim 28, wherein the first portion of the first waveguide is coupled to a second portion of the first waveguide, wherein the second portion of the first waveguide is a high index difference waveguide having a high index core adjacent the photosensitive layer.

30. The programmable optical chip of claim 29, wherein the second optical function is performed in a high index difference waveguide, and wherein the second waveguide is a high index difference waveguide.

31. A programmable optical chip, comprising:
a first optical function;
a first waveguide core extending from the first optical function, the first waveguide core being surrounded by a cladding to form a first waveguide;
a second waveguide core, the second waveguide core being surrounded by the cladding to form a second waveguide; and a photosensitive layer disposed between the first waveguide core and the second waveguide core, the photosensitive layer having a refractive index similar to that of the cladding prior to exposure to irradiation, wherein the photosensitive layer is capable of changing refractive index upon exposure to irradiation to selectively form an optical connection between the first waveguide and the second waveguide;

wherein the first waveguide, second waveguide, first optical function, and photosensitive layer are fabricated on a single substrate.

32. The programmable optical chip of claim 31, wherein, prior to exposure to irradiation, the photosensitive layer does not form an optical connection between the first waveguide and the second waveguide.

33. The programmable optical chip of claim 31, wherein the second waveguide forms an input/output port from the programmable optical chip.

34. The programmable optical chip of claim 33, wherein the first waveguide is a high index difference waveguide, wherein the second waveguide is a low index difference waveguide, and wherein at least a portion of the photosensitive layer becomes a low index difference waveguide core upon exposure to irradiation.

35. The programmable optical chip of claim 34, wherein the index of refraction of the photosensitive layer increases upon exposure to irradiation.

36. The programmable optical chip of claim 35, wherein the first waveguide core has a taper at an end adjacent to the photosensitive layer.

37. The programmable optical chip of claim 36, wherein a coupler is formed between the first waveguide and the photosensitive layer upon exposure to irradiation of the photosensitive layer, and wherein the taper of the first waveguide core is at least partially surrounded by the exposed photosensitive layer.

38. The programmable optical chip of claim 35, wherein the photosensitive layer is made from germanium-doped silica.

39. The programmable optical chip of claim 38, wherein the cladding is made from $SiO_2$ and the first and second waveguide cores are made from $Si_3N_4$.

40. A programmable optical chip, comprising:
a plurality of optical functions, each optical function being connected to a waveguide having a core and a cladding; and
a photosensitive layer disposed between at least three of the waveguides, the photosensitive layer having a refractive index similar to that of the cladding prior to exposure to irradiation, wherein the photosensitive layer is capable of changing refractive index upon exposure to irradiation to selectively form an optical connection between at least two of the waveguides;
wherein the plurality of optical functions, waveguides, and the photosensitive layer are fabricated monolithically on a single substrate.

41. The programmable optical chip of claim 40, wherein, prior to exposure to irradiation, the photosensitive layer does not form an optical connection between the first waveguide and the second waveguide.

42. The programmable optical chip of claim 41, wherein the index of refraction of the photosensitive layer increases upon exposure to irradiation.

43. The programmable optical chip of claim 42, wherein the photosensitive layer is made from germanium-doped silica.

44. A programmable optical chip, comprising:

a plurality of optical functions, each optical function being connected to a waveguide having a core and a cladding; and a plurality of photosensitive layers, each photosensitive layer being disposed between at least two of the optical functions and having a refractive index similar to that of the cladding prior to exposure to irradiation, wherein each photosensitive layer is capable of changing refractive index upon exposure to irradiation to selectively form an optical connection between at least two of the waveguides;

wherein the plurality of optical functions, waveguides, and photosensitive layers are fabricated on a single substrate.

45. The programmable optical chip of claim 44, wherein at least one of the optical functions is performed in a low index difference waveguide and is coupled to a high index difference waveguide.

46. The programmable optical chip of claim 45, wherein at least one of the optical functions is performed in a high index difference waveguide and is coupled to a high index difference waveguide.

47. The programmable optical chip of claim 46, wherein one of the photosensitive layers is disposed between the optical function performed in a high index difference waveguide and the optical function performed in a low index difference waveguide.

48. The programmable optical chip of claim 47, wherein, prior to exposure to irradiation, the photosensitive layer disposed between the optical function performed in a high index difference waveguide and the optical function performed in a low index difference waveguide does not form an optical connection between those two optical functions.

* * * * *